United States Patent

[11] 3,575,663

[72] Inventor Duane E. McIntosh
Palmyra, Wis.
[21] Appl. No. 837,768
[22] Filed June 30, 1969
[45] Patented Apr. 20, 1971
[73] Assignee General Motors Corporation
Detroit, Mich.

[54] BIT RATE SYNCHRONIZER FOR CLOCK AND PULSE CODE MODULATED SIGNALS
3 Claims, 3 Drawing Figs.

[52] U.S. Cl. 328/63, 178/69.5, 307/269, 328/72
[51] Int. Cl. H03k 1/00, H03k 3/04
[50] Field of Search 307/208, 269; 328/63, 72, 133—134, 155, 179; 178/69.5

[56] References Cited
UNITED STATES PATENTS
3,249,878 5/1966 Magnin 328/63

*Primary Examiner*—Stanley D. Miller, Jr.
*Attorneys*—William S. Pettigrew and C. R. Meland

ABSTRACT: An apparatus is provided for synchronizing the bit rate of a clock pulse signal with the bit rate of a pulse code modulated signal. The bit rate of the clock signal is regulated by a control signal so as to synchronize the bit rate of the clock signal with the bit rate of the modulated signal. The control signal is obtained by mixing a reference signal with a variable bias signal. The reference signal represents the difference between the bit rates of the clock signal and the modulated signal. Once the bit rate of the clock signal has been initially synchronized with the bit rate of the modulated signal, the bias signal is adjusted so as to make the reference signal zero. Thus, the bias signal equals the control signal so as to maintain synchronization during periods when transmission of the modulated signal is interrupted.

INVENTOR.
Duane E. McIntosh
BY
C. R. Meland
ATTORNEY

BIT RATE SYNCHRONIZER FOR CLOCK AND PULSE CODE MODULATED SIGNALS

This invention relates to a frequency synchronizer, and more particularly to an apparatus for synchronizing the bit rate of a clock pulse signal with the bit rate of a pulse code modulated signal.

According to one aspect of the invention, the difference between the bit rates of the clock signal and the modulated signal is represented by the difference in the duration of a first pulse and a second pulse. The first and second pulses are developed in response to transitions in the voltage levels of the clock signal and the modulated signal.

In another aspect of the invention, the sense and the degree of the difference in the bit rates of the clock signal and the modulated signal are represented by the polarity and the magnitude of a reference signal, respectively. The reference signal is produced by integrating the first and second pulses. The integration is accomplished by summing first and second voltage signals of equal magnitude, of opposite polarity, and of different duration corresponding to the duration of the first and second pulses, respectively.

According to a further aspect of the invention, the sense and the degree of the difference in the bit rates of the clock signal and the modulated signal are represented by the polarity and the magnitude of a control signal, respectively. The control signal is obtained by mixing the reference signal with a variable bias signal.

In yet another aspect of the invention, the bit rate of the clock signal is synchronized with the bit rate of the modulated signal in response to the control signal. The bit rate of the clock signal is varied in a sense responsive to the polarity of the control signal and to a degree responsive to the magnitude of the control signal.

According to still another aspect of the invention, synchronization is readily maintained during periods when transmission of the modulated signal is momentarily interrupted. Once the bit rates of the clock signal and the modulated signal have been initially synchronized, the bias signal is adjusted so as to make the reference signal a nominal zero. Thus, the bias signal provides the control signal independent of the reference signal.

These and other aspects of the invention will become more apparent by reference to the following detailed description of a preferred embodiment when considered in conjunction with the accompanying drawing, in which.

Figure 2:
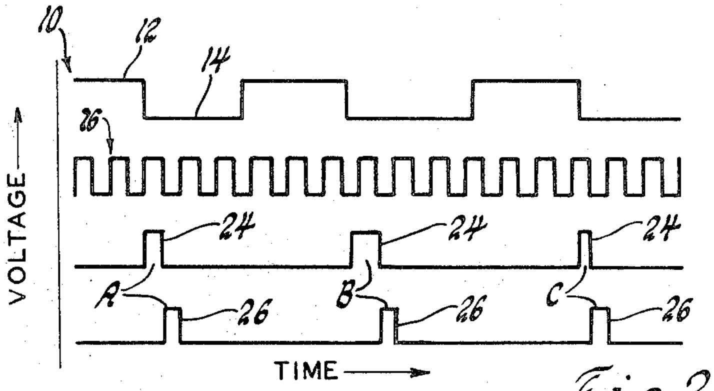
FIG. 2 is a graph of several waveforms useful in explaining the operation of the bit rate synchronizer illustrated in FIG. 1.

FIG. 2 discloses a pulse code modulated signal 10 having an upper voltage level 12 and a lower voltage level 14. The digital information carried by the modulated signal 10 is represented by the number of binary data bits contained within the discrete time intervals during which the signal 10 is at either the upper voltage level 12 or the lower voltage level 14. Hence, if the upper voltage level 12 represents a binary 1 level and the lower voltage level 14 represents a binary 0 level, the time intervals between transitions in the voltage level of the modulated signal 10 represent the number of successive 1 or 0 data bits being transmitted.

FIG. 2 also discloses a clock pulse signal 16 comprising a plurality of pulses having a frequency such that the time period between the leading edge of one pulse and the leading edge of an adjacent pulse represents a single data bit. The number of successive binary 1 and 0 data bits carried by the pulse code modulated signal 10 may be determined by counting the number of pulses of the clock signal 16 occurring between transitions in the voltage level of the modulated signal 10. However, in order to ensure accuracy, it is necessary that the bit rate of the clock signal 16 be synchronized with the bit rate of the modulated signal 10.

Figure 1:
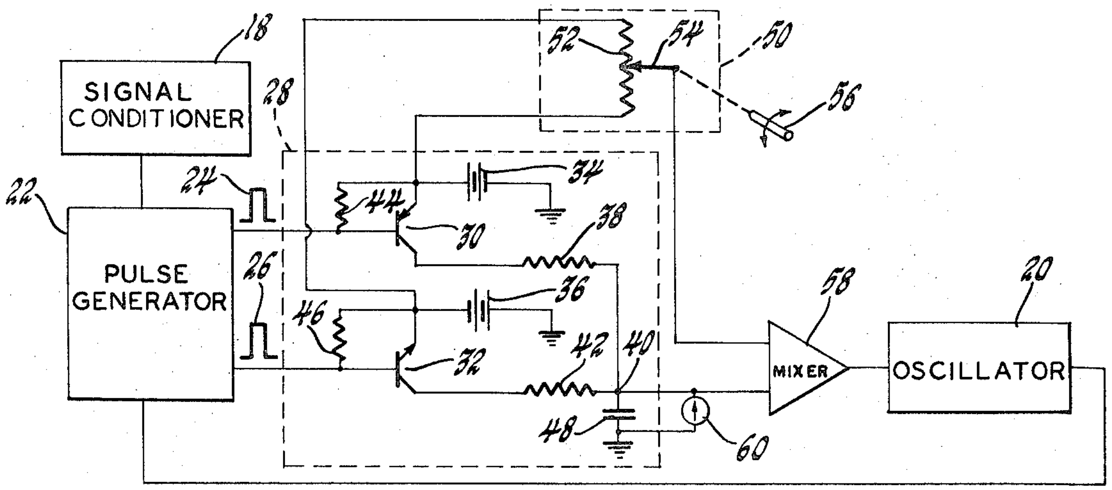
FIG. 1 is a schematic diagram of a bit rate synchronizer incorporating the principles of the invention.

FIG. 1 discloses a system for synchronizing the bit rate of the clock signal 16 with the bit rate of the modulated signal 10. The pulse code modulated signal 10 is produced by a digital signal conditioner 18 which removes high- and low-frequency noise from the modulated signal 10. The signal conditioner 18 forms the subject matter of a application Ser. No. 837,776, filed Jun. 30, 1969 and assigned to the assignee of the present application. The clock pulse signal 16 is produced by a clock signal source 20 which varies the bit rate of the clock signal 16 in response to a control signal applied to the clock signal source 20. The clock signal source 20 may be provided by a conventional voltage controlled oscillator.

A pulse generator 22 is connected to receive the modulated signal 10 and the clock signal 16. The pulse generator 22 produces first and second pulses 24 and 26 as shown in FIG. 2. The first pulse 24 is initiated in response to an upper-to-lower voltage level transition in the modulated signal 10 and is terminated in response to the next upper-to-lower voltage level transition in the clock signal 16 following the upper-to-lower voltage level transition in the modulated signal 10. The second pulse 26 is initiated in response to the next upper-to-lower voltage level transition in the clock signal 16 following an upper-to-lower voltage level transition in the modulated signal 10 and is terminated in response to the next lower-to-upper voltage level transition in the clock signal 16.

It will be observed that when an upper-to-lower voltage level transition in the modulated signal 10 coincides with a lower-to-upper voltage level transition in the clock signal 16, the duration of the first pulse 24 equals the duration of the second pulse 26 as indicated by the A set of pulses 24 and 26 shown in FIG. 2. However, if an upper-to-lower voltage level transition in the modulated signal 10 occurs earlier than a lower-to-upper voltage level transition in the clock signal 16, the duration of the first pulse 24 is correspondingly longer than the duration of the second pulse 26 as indicated by the B set of pulses 24 and 26 shown in FIG. 2. Conversely, if an upper-to-lower voltage level transition in the modulated signal 10 occurs later than a lower-to-upper voltage level transition in the clock signal 16, the duration of the first pulse 24 is correspondingly shorter than the duration of the second pulse 26 as indicated by the C set of pulses 24 and 26 shown in FIG. 2.

When all upper-to-lower voltage level transitions in the modulated signal 10 coincide with all lower-to-upper voltage level transitions in the clock signal 16, the bit rate of the clock signal 16 is synchronized with the bit rate of the modulated signal 10. Consequently, the duration of the first pulse 24 is equal to the duration of the second pulse 26 when the bit rates of the modulated signal 10 and the clock signal 16 are synchronized in frequency and in phase. When an upper-to-lower voltage level transition in the modulated signal 10 occurs either earlier or later than a lower-to-upper voltage level transition in the clock signal 16, the bit rate of the clock signal 16 is not synchronized with the bit rate of the modulated signal 10. Accordingly, the duration of the pulse signal 24 is shorter or longer than the duration of the second pulse signal 26 in response to the difference between the bit rates of the clock signal 16 and the modulated signal 10.

Referring again to FIG. 1, an integrator 28 is connected to receive the first and second pulse signals 24 and 26 for producing a reference signal representing an integration of the difference between the first and second pulse signals 24 and 26. The integrator 28 includes first and second switching devices provided by first and second junction transistors 30 and 32, each having base, emitter and collector electrodes. The first transistor 30 is of the PNP type and the second transistor 32 is of the NPN type. The emitter electrode of the first transistor 30 is connected to a first voltage source 34. The emitter electrode of the second transistor 32 is connected to a second voltage source 36. The voltage signals provided by the first and second voltage sources 34 and 36 are of equal magnitude and of opposite polarity. The first voltage source 34 provides a positive voltage signal and the second voltage source 36 provides a negative voltage signal. The first and second voltage sources may be any suitable direct current voltage sources such as conventional batteries.

The collector of the first transistor 30 is connected through a resistor 38 to a junction 40. The collector of the second transistor 32 is connected through a resistor 42 to the junction 40. A pair of biasing resistors 44 and 46 are connected between the emitter and base electrodes of the first and second transistors 30 and 32, respectively, for normally biasing the transistors 30 and 32 to the off or nonconductive condition. The base electrode of the first transistor 30 is connected to receive the first pulse 24 produced by the pulse generator 22. The base electrode of the second transistor 32 is connected to receive the second pulse 26 produced by the pulse generator 22.

The first transistor 30 is turned on or rendered fully conductive by the first pulse 24. In the conductive state, the first transistor 30 applies a positive first voltage signal from the first voltage source 34 through the resistor 38 to the junction 40. Similarly, the second transistor 32 is turned on or rendered fully conductive by the second pulse 26. In the conductive state, the second transistor 32 applies a negative second voltage signal through the resistor 42 to the junction 40. The first and second transistors 30 and 32 are turned on for a period equal to the duration of the first and second pulses 24 and 26, respectively.

A capacitor 48 is connected from the junction 40 to ground. The capacitor 48 integrates the first and second voltage signals applied by the first and second transistors 30 and 32 to obtain a reference signal. The polarity of the reference signal represents the sense of the difference between the bit rates of the clock signal 16 and the modulated signal 10. Hence, if the reference signal has a positive polarity, it indicates that the bit rate of the clock signal 16 lags the bit rate of the modulated signal 10. Conversely, if the reference signal has a negative polarity, it indicates that the bit rate of the clock signal 16 leads the bit rate of the modulated signal 10. The magnitude of the reference signal represents the degree of the difference between the bit rates of the clock signal 16 and the modulated signal 10.

A bias signal source 50 is provided by a potentiometer comprising a resistor 52 cooperating with a wiper arm 54. The resistor 52 is connected between the first voltage source 34 and the second voltage source 36. The voltage established across the resistor 52 extends from the positive voltage provided by the first voltage source 34 to the negative voltage provided by the second voltage source 36. The wiper arm 54 is adjustable over the length of the resistor 52 through a manually operable control knob 56 which is mechanically connected with the wiper arm 54. A variable bias voltage is defined between the wiper arm 54 and ground. The bias voltage may be positive or negative.

A mixer 58 is connected to the junction 40 in the integrator 28 to receive the reference signal and is connected to the wiper arm 54 of the bias signal source 50 to receive the bias signal. The reference signal is mixed with the bias signal by the mixer 58 to obtain a control signal. Similar to the reference signal, the sense and the degree of the difference between the bit rates of the clock signal 16 and the modulated signal 10 is represented by the magnitude and the polarity of the control signal. The mixer 58 may be conveniently provided by a conventional differential amplifier, such as a Fairchild Model 709. In such case, the reference signal is actually subtracted from the bias signal to obtain the control signal.

The clock signal source 20, which may be a conventional voltage controlled oscillator, is connected to the mixer 58 to receive the control signal. The voltage controlled oscillator 20 varies the bit rate of the clock signal 16 in a sense and to a degree responsive to the polarity and the magnitude of the control signal so as to synchronize the bit rate of the clock signal 16 with the bit rate of the modulated signal 10. Once the bit rate of the clock signal 16 is initially synchronized with the bit rate of the modulated signal 10, the reference signal remains substantially unchanged due to the equal duration of the first and second voltage signals applied to the capacitor 48. Since the reference signal remains fairly constant, the control signal likewise remains relatively stable so as to keep the bit rate of the clock signal 16 nominally centered about the bit rate of the modulated signal 10. Of course, the reference signal and the control signal experience minor excursions in order to compensate for slight variations in the bit rate of the modulated signal 10 during transmission.

However, if transmission of the modulated signal 10 is interrupted for a brief period, as is very common, the reference signal on the capacitor 48 is quickly discharged. As the reference signal is dissipated, the control signal is correspondingly varied thereby to alter the bit rate of the clock signal 16. Therefore, when transmission of the modulated signal is resumed, the bit rate of the clock signal 16 is out of synchronization with the bit rate of the modulated signal 10. Thus, it is necessary to again initially synchronize the bit rate of the clock signal 16 with the bit rate of the modulated signal 10. Hence, it is desirable to preserve synchronization during periods when transmission of the modulated signal 10 is interrupted. This result may be accomplished by maintaining the control signal through proper adjustment of the bias signal.

A voltmeter 60 is connected across the capacitor 48 for monitoring the reference voltage. Once the bit rate of the clock signal 16 has been initially synchronized with the bit rate of the modulated signal 10, the control knob 56 is manually manipulated so as to adjust the setting of the wiper arm 54 on the resistor 52 thereby altering the bias signal. As the bias signal is altered, the control signal is correspondingly changed so as to throw the bit rate of the clock signal 16 out of synchronization with the bit rate of the modulated signal 10. Since the bit rates of the clock signal 16 and the modulated signal 10 are out of synchronization, the reference signal varies thereby to change the control signal so as to bring the bit rate of the clock signal 16 back into synchronization with the bit rate of the modulated signal 10. By properly adjusting the setting of the wiper arm 54 on the resistor 52, the reference signal on the capacitor 48 is reduced to zero as indicated by the voltmeter 60.

With the reference signal forcibly set at zero, the control signal is provided entirely by the bias signal. Now, if transmission of the modulated signal 10 is interrupted for a brief period, the reference signal is not lost since it is already zero. The control signal is continuously maintained by the bias signal. Hence, when transmission of the modulated signal 10 is resumed, the bit rate of the clock signal 16 is still nominally centered about the bit rate of the modulated signal 10. Therefore, the necessity of again initially synchronizing the bit rate of the clock signal 16 with the bit rate of the modulated signal 10 is avoided.

Figure 3:
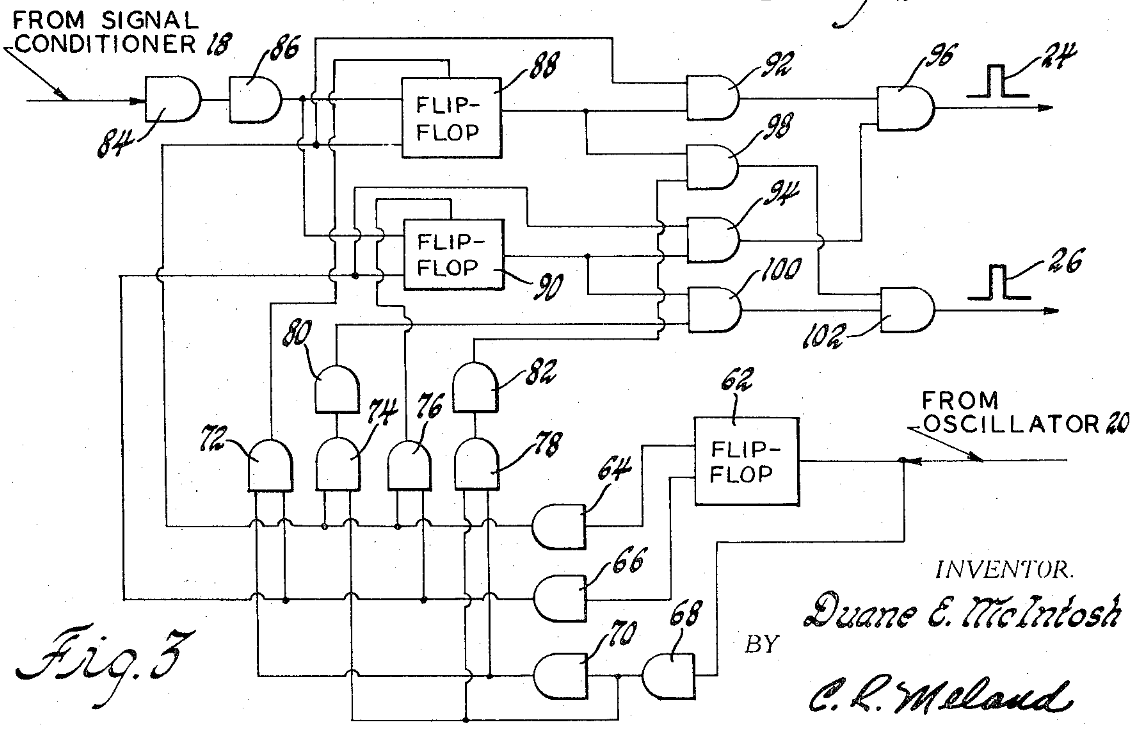
FIG. 3 is a logic diagram of the pulse generator incorporated within the bit rate synchronizer illustrated in FIG. 1.

FIG. 3 discloses a preferred embodiment of the pulse generator 22 illustrated in FIG. 1. A flip-flop 62 is connected to receive the clock signal 16 for producing a pair of command signals comprising complemented and uncomplemented outputs of the clock signal 16 at a frequency reduced by one-half. A pair of NAND gates 64 and 66 are connected to the flip-flop 62 for converting the command signals to a suitable logic voltage level. Similarly, a pair of NAND gates 68 and 70 are connected in series to receive the clock signal 16 for producing complemented and uncomplemented outputs of the clock signal 16 converted to a suitable logic voltage level. A plurality of NAND gates 72, 74, 76 and 78 are connected with the gates 64 and 66 and with the gates 68 and 70, as shown, for producing first, second, third and fourth identical timing signals, respectively. The timing signals each comprise a repetitive pulse signal which is one clock pulse out of phase with the repetitive pulse signal representing the next successive one of the timing signals. A pair of NAND gates 80 and 82 are connected to the gates 74 and 78 for producing outputs complementing the timing signals produced by the gates 74 and 78.

A pair of NAND gates 84 and 86 are connected in series to receive the modulated signal 10 for producing complemented and uncomplemented outputs of the modulated signal 10 converted to a suitable logic voltage level. A pair of flip-flops 88 and 90 are each connected to the gate 86 to receive the uncomplemented modulated signal 10. The flip-flops 88 and 90 are also connected with the gates 64 and 66 to receive the command signals. The command signals alternately enable the flip-flops 88 and 90 so that the enabled one of the flip-flops 88 and 90 is switched to the set position to produce an output signal in response to the absence of the modulated signal 10. Further, the flip-flops are connected to the gates 72 and 76 to receive the first and third timing signals. The enabled one of the flip-flops 88 and 90 is switched to the reset position to terminate the output signal in response to the absence of the associated one of the first and third timing signals. A pair of NAND gates 92 and 94 are connected with the flip-flops 88 and 90 to receive the output signals and with the gates 64 and 66 to receive the command signals. A NAND gate 96 is connected to the gates 92 and 94 for producing the first pulse 24. A pair of NAND gates 98 and 100 are connected with the flip-flops 88 and 90 to receive the output signals and with the gates 80 and 82 to receive the complemented second and fourth timing signals. A NAND gate 102 is connected to the outputs of the gates 98 and 100 for producing the second pulse 26.

It can be demonstrated through an examination of the waveforms developed within the illustrated logic circuit that the first pulse 24 is initiated in response to an upper-to-lower voltage level transition in the modulated signal 10 and is terminated in response to the next upper-to-lower voltage level transition in the clock signal 16 following the upper-to-lower voltage level transition in the modulated signal 10. Similarly, it can be shown that the second pulse 26 is initiated in response to the next upper-to-lower voltage level transition in the clock signal 16 following an upper-to-lower voltage level transition in the modulated signal 10 and is terminated in response to the next lower-to-upper voltage level transition in the clock signal 16. Preferably, the flip-flops and the NAND gates are Texas Instrument Series 7400N logic elements.

It will now be readily apparent that the subject invention provides a simple and reliable bit rate synchronizer which is capable of keeping the bit rate of a clock pulse signal synchronized with the bit rate of a pulse code modulated signal during periods when transmission of the pulse code modulated signal is interrupted. Accordingly, the subject bit rate synchronizer has utility in virtually all types of pulse code modulated telemetry applications.

I claim:

1. An apparatus for synchronizing the bit rate of a clock pulse signal with the bit rate of a modulated pulse signal, comprising: clock signal source means for providing the clock pulse signal; modulated signal source means for providing the modulated pulse signal; pulse generator means connected to receive the clock signal and the modulated signal for producing first and second pulses of such duration that the difference in the duration of the first and second pulses represents the difference in the bit rates of the clock signal and the modulated signal; integrator means connected to receive the first and second pulses for integrating the difference between the first and second pulses to obtain a reference signal; adjustable bias signal source means for producing a variable bias signal; and mixer means connected to receive the reference signal and the bias signal for mixing the reference signal and the bias signal to obtain a control signal, the control signal having a polarity representing the sense of the difference in the bit rates of the clock signal and the modulated signal and having a magnitude representing the degree of the difference in the bit rates of the clock signal and the modulated signal; the clock signal source means connected to receive the control signal for varying the bit rate of the clock signal in a sense responsive to the polarity of the control signal and to a degree responsive to the magnitude of the control signal so as to synchronize the bit rate of the clock signal with the bit rate of the modulated signal; whereby once the bit rates of the clock signal and the modulated signal have been initially synchronized, the bias signal may be varied so as to make the reference signal zero thereby to preserve synchronization during periods when transmission of the modulated signal is interrupted by maintaining the control signal which is provided by the bias signal.

2. An apparatus for synchronizing the bit rate of a bilevel clock pulse signal with the bit rate of a bilevel modulated pulse signal, the clock signal and the modulated signal including successive voltage level transitions between an upper voltage level and a lower voltage level, the apparatus comprising: clock signal source means for providing the clock pulse signal; modulated signal source means for providing the modulated signal; pulse generator means connected to receive the clock signal and the modulated signal for producing first and second pulses, the first pulse being initiated in response to an upper-to-lower voltage level transition in the modulated signal and terminated in response to the next upper-to-lower voltage level transition in the clock signal following the upper-to-lower voltage level transition in the modulated signal, the second pulse being initiated in response to the next upper-to-lower voltage level transition in the clock signal following an upper-to-lower voltage level transition in the modulated signal and being terminated in response to the next lower-to-upper voltage level transition in the clock signal; first and second voltage control means connected to receive the first and second pulse signals for providing first and second voltage signals of equal magnitude, of opposite polarity, and of a duration equal to the duration of the first and second pulse signals, respectively; voltage summing means connected to receive the first and second voltage signals for averaging the first and second voltage signals to obtain a reference signal; adjustable bias signal source means for producing a variable bias signal; and mixer means connected to receive the reference signal and the bias signal for mixing the reference signal with the bias signal to obtain a control signal, the control signal having a polarity representing the sense of the difference in the bit rates of the clock signal and modulated signal, and having a magnitude representing the degree of the difference in the bit rates of the clock signal and the modulated signal; the clock signal source means connected to receive the control signal for varying the bit rate of the clock signal in a sense responsive to the polarity of the control signal and to a degree responsive to the magnitude of the control signal so as to synchronize the bit rate of the clock signal with the bit rate of the modulated signal; whereby once the bit rates of the clock signal and the modulated signal have been initially synchronized, the bias signal may be varied so as to make the reference signal zero thereby to preserve synchronization during periods when transmission of the modulated signal is interrupted by maintaining the control signal which is provided by the bias signal.

3. An apparatus for synchronizing the bit rate of a bilevel clock pulse signal with the bit rate of a bilevel modulated pulse signal, the clock signal and the modulated signal including successive voltage level transitions between an upper voltage level and a lower voltage level, the apparatus comprising: oscillator means for providing the dock pulse signal; modulated signal source means for providing the modulated pulse signal; pulse generator means connected to receive the clock signal and the modulated signal for producing first and second pulses, the first pulse being initiated in response to an upper-to-lower voltage level transition in the modulated signal and being terminated in response to the next upper-to-lower voltage level transition in the clock signal following the upper-to-lower voltage level transition in the modulated signal, the second pulse being initiated in response to the next upper-to-lower voltage level transition in the clock signal following an upper-to-lower voltage level transition in the modulated signal and being terminated in response to the next lower-to-upper voltage level transition in the clock signal; first and second voltage sources for providing first and second voltages of equal magnitude and of opposite polarity; first switching means connected to receive the first voltage and the first pulse for providing a first voltage signal having a duration equal to the duration of the first pulse; second switching means connected to receive the second voltage and the second pulse for providing a second voltage signal having a duration equal to the duration of the second pulse; capacitance means connected to receive the first and second voltage signals for integrating the first and second voltage signals to provide a reference signal; manually adjustable potentiometer means for providing a variable bias signal; and differential amplifier means connected to receive the reference signal and the bias signal for mixing the reference signal with the bias signal to obtain a control signal, the control signal having a polarity representing the sense of the difference in the bit rates of the clock signal and the modulated signal and having a magnitude representing the degree of the difference in the bit rates of the clock signal and the modulated signal; the oscillator means connected to receive the control signal for varying the bit rate of the clock signal in a sense responsive to the polarity of the control signal and to a degree responsive to the magnitude of the control signal so as to synchronize the bit rate of the clock signal with the bit rate of the modulated signal; whereby once the bit rates of the clock signal and the modulated signal have been initially synchronized, the bias signal may be varied so as to make the reference signal zero thereby to preserve synchronization during periods when transmission of the modulated signal is interrupted by maintaining the control signal which is provided by the bias signal.